Oct. 10, 1961 C. W. ASH ET AL 3,003,571
PARKING MEANS FOR AUTOMOBILES AND THE LIKE
Filed May 23, 1960 3 Sheets-Sheet 1

INVENTORS
CLARK W. ASH
ANNE A. VAN GINKEL-ONDRUS
BY
Knox & Knox

INVENTORS
CLARK W. ASH
ANNE A. VAN GINKEL-ONDRUS
BY
*Knox & Knox*

Oct. 10, 1961 C. W. ASH ET AL 3,003,571
PARKING MEANS FOR AUTOMOBILES AND THE LIKE
Filed May 23, 1960 3 Sheets-Sheet 3

INVENTORS
CLARK W. ASH
ANNE A. VAN GINKEL-ONDRUS
BY
Knox & Knox

United States Patent Office 3,003,571
Patented Oct. 10, 1961

3,003,571
PARKING MEANS FOR AUTOMOBILES
AND THE LIKE
Clark W. Ash, 2806 6th St., and Anne A. van Ginkel-Ondrus, 2740 6th St., both of San Diego, Calif.
Filed May 23, 1960, Ser. No. 31,023
3 Claims. (Cl. 180—1)

The present invention relates generally to automobile accessories and more particularly to parking means for automotive vehicles.

The primary object of this invention is to provide a parking means for automobiles or other vehicles by which the vehicle may be lifted and moved laterally into a small parking space, the mechanism being attached directly to the vehicle frame and being operated by the existing vehicle power supply.

Another object of this invention is to provide parking means which may be installed on many different types of vehicles without modification of the existing structure.

Another object of this invention is to provide parking means which is compact, light in weight and contains a minimum of parts, the mechanism being self-contained including actuating and driving means and requiring only simple connections to a source of power on the vehicle.

A further object of this invention is to provide parking means which is low in cost to build and easily serviced and which can be made in various sizes for different types of vehicles.

Finally, it is an object to provide parking means of the aforementioned character which is simple and convenient to install and operate and which will give generally efficient and durable service.

With these and other objects definitely in view, this invention consists in the novel construction, combination and arrangement of elements and portions, as will be hereafter fully described in the specification, particularly pointed out in the claims, and illustrated in the drawings which form a material part of this disclosure, and in which:

Similar characters of reference indicate similar or identical elements and portions throughout the specification and throughout the views of the drawings.

Figure 1:
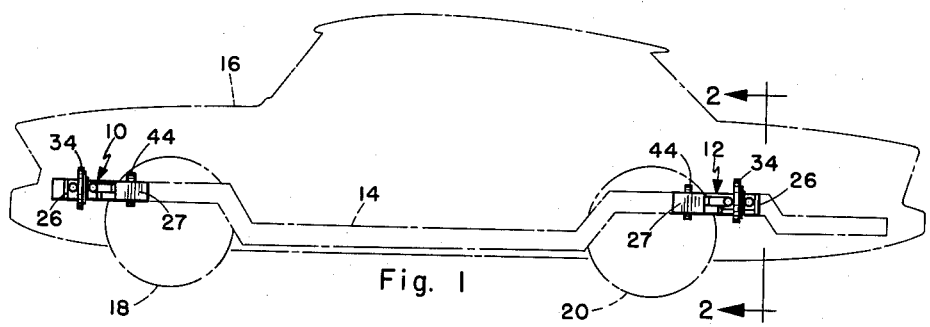
FIGURE 1 is a side elevation view of the parking means in retracted position, a vehicle outline and frame being indicated in broken line to illustrate the preferred disposition of the mechanism.

The parking means comprises a pair of similar structural assemblies, a front assembly 10 and a rear assembly 12, preferably attached to the frame rails 14 of a vehicle, generally indicated at 16. The front assembly 10 is mounted substantially forwardly of the front wheels 18 where sufficient clearance is available, most vehicles having sufficient space in front of the engine. The rear assembly 12 is mounted generally rearwardly of the rear wheels 20 and, since both assemblies are similar in structure and operation, the rear assembly only will be described in detail, similar reference numerals being used to refer to analogous elements in the front and rear assemblies.

The rear assembly 12 comprises a driving unit 22 and a stabilizing unit 24 pivotally attached to opposite frame rails 14 by rigid brackets 26 and 27, respectively, the stabilizing unit being longitudinally offset from the driving unit so that the two units can overlap when retracted. Either unit may be the forward mounted element, depending on available space and attachment accessibility. The driving unit 22 has a pair of rigid legs 28 interconnected adjacent one end by a spacer 30, that end of the structure being pivotally attached to bracket 26 by a hinge pin 32 to swing downwardly and outwardly from the center line of the vehicle. Between the free ends of the legs 28 is a driving wheel 34 on an axle 36, said driving wheel having a motor 38 directly mounted thereon, which is designed or suitably geared to turn the driving wheel at a reasonably slow speed.

The stabilizing unit 24 has a pair of legs 40 connected at one end by a spacer 42 and pivotally attached to the bracket 27 by a further hinge pin 43. Between the free ends of legs 40 is a stabilizing wheel 44 freely rotatable on an axle 46.

Fixed to the outside of one of the legs 28, adjacent the spacer 30, is an arm 48 having thereon an offset lug 50 which is spaced below the axis of hinge pin 32 when said leg is horizontal. Similarly fixed to the outside of one leg 40, immediately adjacent the leg carrying arm 48, is a second arm 52 having an offset lug 54 which is spaced below the axis of hinge pin 43 when legs 40 are horizontal.

Pivotally attached to the arm 48 is a telescopic jack 56, held by a connecting pin 58 through effectively offset connecting means such as the offset lug 50, said jack having an extensible actuating rod 60, the body of the jack being pivotally attached to the arm 52 by a connecting pin 62 through offset lug 54. Thus the two units 22 and 24 are interconnected by a single jack for simultaneous operation. For safety and additional rigidity, the leg units 22 and 24 are supported by stop blocks 63 fixed to the brackets 26 and 27 when the leg units are extended vertically downwardly.

Figure 6:
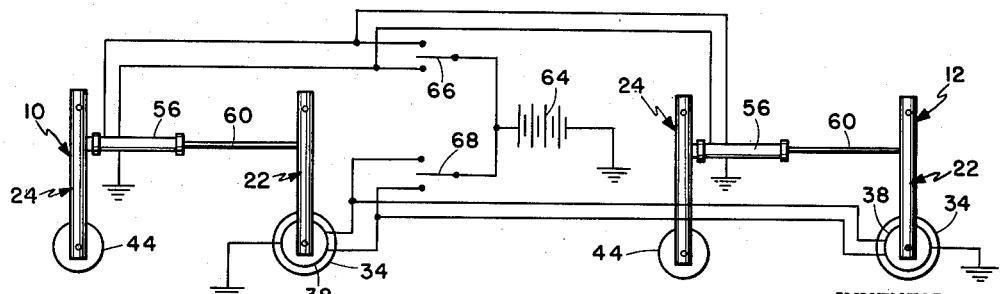
FIGURE 6 is a diagram of the actuating system of the parking means.

Since the majority of vehicles have electrical systems with reasonable power supplies, the apparatus is preferably electrically operated, in which case the motors 38 are suitable electric motors and the jacks 56 are electric screw jacks of any well known type such as, for example, the "Airborne R—1604 M5 Rotorac" as manufactured by the Airborne Accessories Corporation, Hillside, N.J., with sufficient extension. With reference to FIGURE 6, the jacks 56 are connected to the vehicle power supply, indicated by a battery 64, through a common two-way reversing switch 66, the motors 38 also being connected to said battery through a reversing switch 68.

Figure 2:
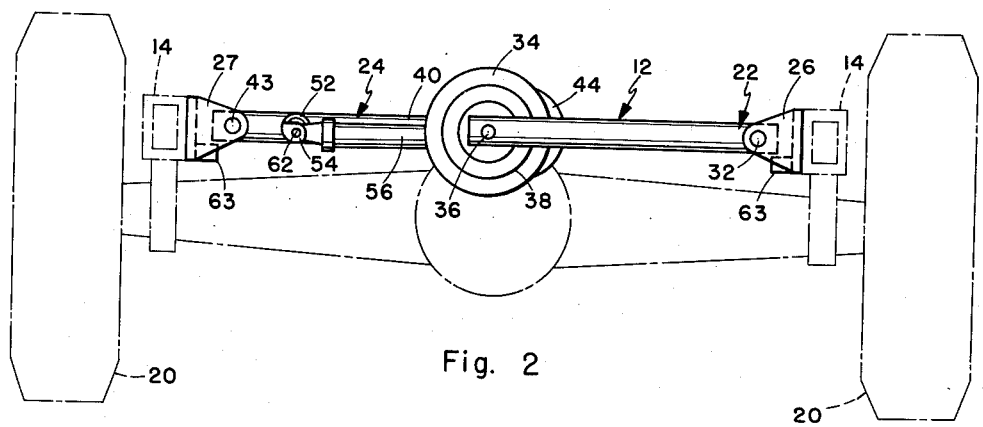
FIGURE 2 is an enlarged elevation view taken in the direction of line 2—2 of FIGURE 1.
Figure 3:
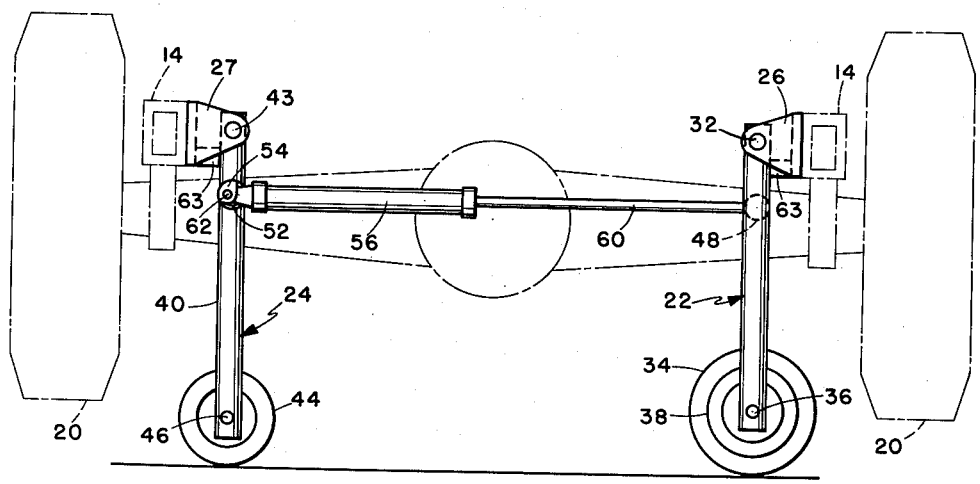
FIGURE 3 is an end elevation view similar to FIGURE 2, but showing the mechanism extended in parking position.
Figure 4:
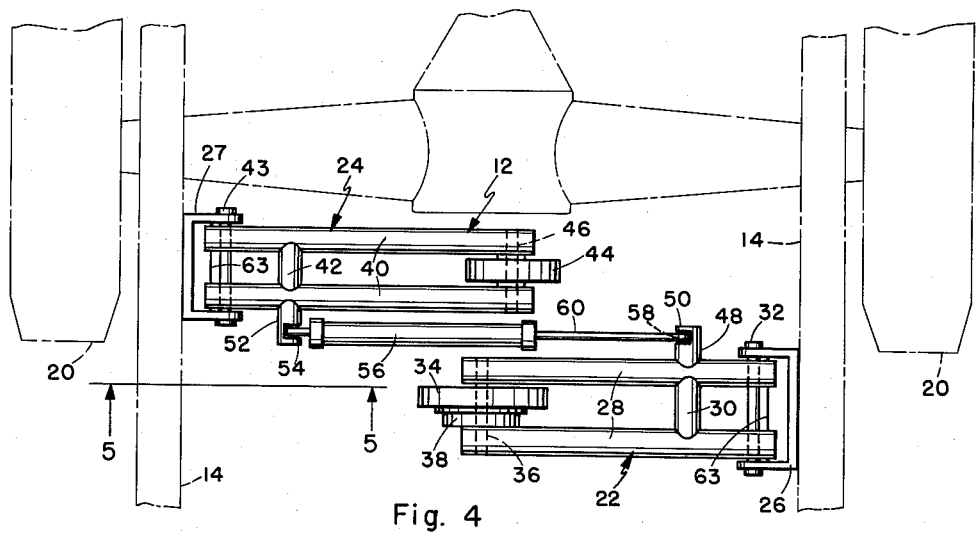
FIGURE 4 is a top plan view of the mechanism in retracted position.
Figure 5:
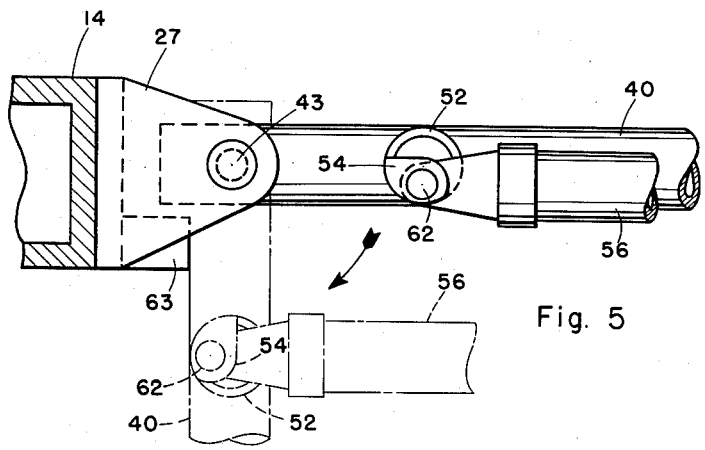
FIGURE 5 is an enlarged, fragmentary sectional view taken on the line 5—5 of FIGURE 4.

For normal driving, the front and rear assemblies 10 and 12 are retracted with their units generally horizontally disposed under the vehicle, as in FIGURES 1, 2 and 4. In parking, the vehicle is aligned with the space to be occupied and the reversing switch 66 is operated in one direction to actuate jacks 56. Since the connecting pins 58 and 62 are offset below the axes of hinge pins 32 and 43, extension of jacks 56 forces the driving units 22 and stabilizing units 24 outwardly and downwardly, as in FIGURE 5, into contact with the ground. The vehicle wheels 18 and 20 are raised from the ground and leaving the vehicle supported on the driving wheels 34 and stabilizing wheels 44, as in FIGURE 3. In this position, the reversing switch 68 is operated to start motors 38 and move the vehicle sideways into the parking space, which can be considerably smaller than is required for normal parallel parking. If necessary the front and rear motors 38 may be operated by separate switches for vehicle alignment, but normally this would not be necessary, the simultaneous operation of both motors ensuring even motion to either side. Once parked, the front and rear assemblies 10 and 12 can be retracted by reversing the switch 66, so avoiding prolonged strain on the units.

When leaving the parking space, the units 22 and 24 are again extended by jacks 56 and the motors 38 operated in reverse to move the vehicle sideways into clear space, after which the assemblies are retracted, leaving the vehicle on its wheels for normal driving. As an added feature, the apparatus is particularly useful in the event of a flat tire, the vehicle being easily lifted without effort to raise all wheels clear of the ground. If desired the front and rear assemblies 10 and 12 may be made individually operable for such a purpose.

Figure 7:
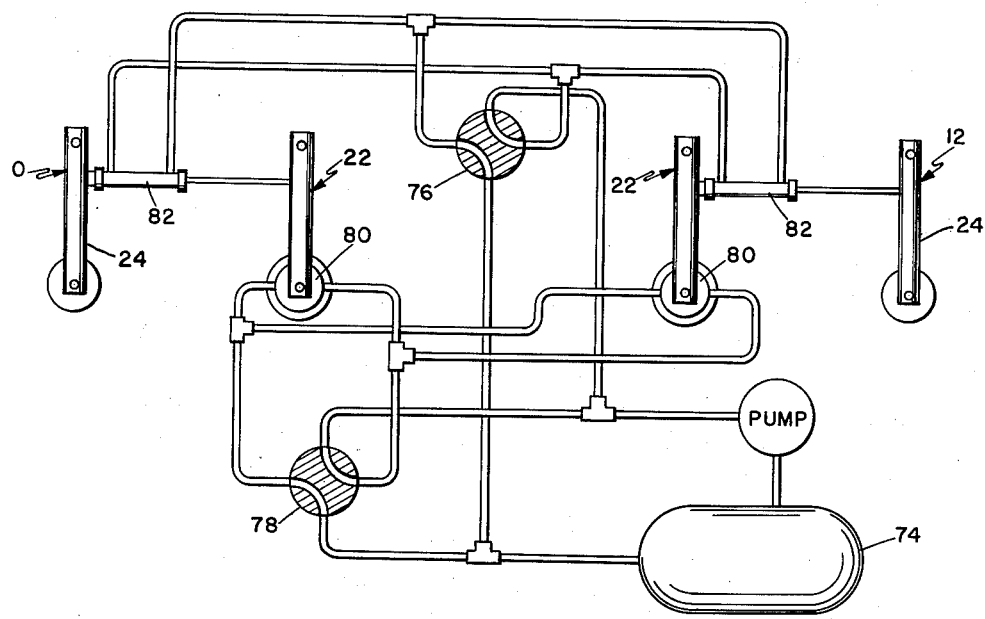
FIG. 7 is a diagram of an alternative actuating system.

While an electrically operated system is illustrated, it should be understood that hydraulic or pneumatic means may be used, as in FIGURE 7, by substituting a pressure reservoir 74 for battery 64 and two-way valves 76 and 78 for switches 66 and 68. In certain types of vehicles having existing fluid pressure systems, such an arrangement may be desirable and involves only the replacement of motors 38 and jacks 56 with comparable fluid actuated units, 80 and 82 respectively the basic structure and operation of the apparatus being unchanged.

Strains on the various pivots and other elements of the system are reduced due to the single jack interconnection of the driving and stabilizing units because one of the wheels 34, 44 can remain temporarily stationary upon contact with the road surface while the other wheel continues to roll toward its limit position, whereupon the first mentioned wheel completes its travel in the lifting of the vehicle. Besides lessening the strain on the pivots and parts concerned, this feature also results in minimum power being necessary to erect the units 22 and 24.

By incorporating the driving motors 38 directly into the wheel 34, the system is made independent of mechanical connection to the vehicle, other than mere hinging to the frame, and eliminates the need for a remote power unit or power take-off from the vehicle engine. The use of a single jack 56 to operate each pair of wheeled parking units greatly simplifies installation and reduces cost and complexity. The complete system is extremely simple and adaptable to many different vehicles with little, if any, modification to the vehicle structure.

The operation of this invention will be clearly comprehended from a consideration of the foregoing description of the mechanical details thereof, taken in connection with the drawings and the above recited objects. It will be obvious that all said objects are amply achieved by this invention.

It is understood that minor variation from the form of the invention disclosed herein may be made without departure from the spirit and scope of the invention, and that the specification and drawings are to be considered as merely illustrative rather than limiting.

We claim:

1. Parking apparatus for use with a wheeled vehicle having a frame, said apparatus comprising:

two pairs of leg units, each of said leg units having a substantially rectangular form comprising two substantially parallel side pieces, two substantially parallel end pieces, spacing means for maintaining the spacing between said side pieces, one of said end pieces being adapted for pivotal mounting, the other of said end pieces having a ground-contacting wheel mounted thereon, and an offset lug mounted on one of said side pieces;

leg unit mounting means positioned on said frame adjacent each wheel of said vehicle, said leg unit mounting means comprising a bracket that engages the pivotal end piece of said leg units and causes said leg units to pivot in a vertical direction, pairs of said leg unit mounting means being positioned on opposite sides of said frame to position a pair of said leg units at opposite ends of said frame, whereby said wheel of said leg units rotates in a direction transverse to the longitudinal axis of said frame;

a telescopic jack operatively associated with each pair of leg units positioned at the ends of said frame, said jack having a casing and a single extensible rod;

means for pivotally connecting the ends of said casings to the lugs of one leg unit of a pair;

means for pivotally connecting the free end of said jack rod to the lug of the other leg unit of a pair;

a source of power connected to each said jack to operate each said jack;

first means, comprising said source of power, for extending said jacks and causing the pivotal connections at the ends thereof to force said lugs apart and pivot each said pair of leg units into a vertical position, whereby said wheels of said leg units support said vehicle;

second means, comprising said source of power for telescoping said jacks and causing the pivotal connections thereof to bring said lugs toward each other and pivot said leg units into horizontal positions, whereby the leg units and their wheels are foldably retracted under said frame;

a motor attached to one wheel of each pair of leg units;

means for connecting said source of power to said motors;

and means whereby when said leg units are in their vertical position with their wheels supporting said vehicle, said source of power may rotate said wheels and move said frame in a direction transverse to its longitudinal axis.

2. Parking apparatus for use with a wheeled vehicle having a frame, said apparatus comprising:

two pairs of leg units, each of said leg units having a substantially rectangular form comprising two substantially parallel side pieces, two substantially parallel end pieces, spacing means for maintaining the spacing between said side pieces, one of said end pieces being adapted for pivotal mounting, the other of said end pieces having a ground-contacting wheel mounted thereon, and an offset lug mounted on one of said side pieces;

leg unit mounting means positioned on said frame adjacent each wheel of said vehicle, said leg unit mounting means comprising a bracket that engages the pivotal end piece of said leg units and causes said leg units to pivot in a vertical direction, pairs of said leg unit mounting means being positioned on opposite sides of said frame to position a pair of said leg units at opposite ends of said frame, whereby said wheel of said leg units rotates in a direction transverse to the longitudinal axis of said frame;

a telescopic jack operatively associated with each pair of leg units positioned at the ends of said frame, said jack having a casing and a single extensible rod;

means for pivotally connecting the ends of said casings to the lugs of one leg unit of a pair;

means for pivotally connecting the free end of said jack rod to the lug of the other leg unit of a pair;

a battery source of power connected to each said jack to operate each said jack;

a first reversing switch;

first means, comprising one position of said first reversing switch and said source of power, for extending said jacks and causing the pivotal connections at the ends thereof to force said lugs apart and pivot each said pair of leg units into a vertical position, whereby said wheels of said leg units support said vehicle;

second means, comprising another position of said first reversing switch and said source of power for telescoping said jacks, and causing the pivotal connections thereof to bring said lugs toward each other and pivot said leg units into horizontal positions, whereby the leg units and their wheels are foldably retracted under said frame;

a motor attached to one wheel of each pair of leg units;

means for connecting said source of power to said motors;

a second reversing switch;

and means, comprising said second reversing switch, whereby when said leg units are in their vertical position with their wheels supporting said vehicle, said source of power may rotate said wheels and move said frame in a direction transverse to its longitudinal axis.

3. Parking apparatus for use with a wheeled vehicle having a frame, said apparatus comprising:

two pairs of leg units, each of said leg units having a substantially rectangular form comprising two substantially parallel side pieces, two substantially parallel end pieces, spacing means for maintaining the spacing between said side pieces, one of said end pieces being adapted for pivotal mounting, the other of said end pieces having a ground-contacting wheel mounted thereon, and an offset lug mounted on one of said side pieces;

leg unit mounting means positioned on said frame adjacent each wheel of said vehicle, said leg unit mounting means comprising a bracket that engages the pivotal end piece of said leg units and causes said leg units to pivot in a vertical direction, pairs of said leg unit mounting means being positioned on opposite sides of said frame to position a pair of said leg units at opposite ends of said frame, whereby said wheel of said leg units rotates in a direction transverse to the longitudinal axis of said frame;

a telescopic jack operatively asociated with each pair of leg units positioned at the ends of said frame, said jack having a casing and a single extensible rod;

means for pivotally connecting the ends of said casings to the lugs of one leg unit of a pair;

means for pivotally connecting the free end of said jack rod to the lug of the other leg unit of a pair;

a pressure reservoir source of power connected to each said jack to operate each said jack;

a first two-way valve;

first means, comprising one position of said first two-way valve and said source of power, for extending said jacks and causing the pivotal connections at the ends thereof to force said lugs apart and pivot each said pair of leg units into a vertical position, whereby said wheels of said leg units support said vehicle;

second means, comprising another position of said first two-way valve and said source of power for telescoping said jacks and causing the pivotal connections thereof to bring said lugs toward each other and pivot said leg units into horizontal positions, whereby the leg units and their wheels are foldably retracted under said frame;

a motor attached to one wheel of each pair of leg units;

means for connecting said source of power to said motors;

a second two-way valve; and means, comprising said second two-way valve, whereby when said leg units are in their vertical position with their wheels supporting said vehicle, said source of power may rotate said wheels and move said frame in a direction transverse to its longitudinal axis.

References Cited in the file of this patent

UNITED STATES PATENTS

| | | |
|---|---|---|
| 1,639,054 | Palmer | Aug. 16, 1927 |
| 2,212,591 | De Manghi | Aug. 27, 1940 |
| 2,638,995 | Gottlieb | May 19, 1953 |

FOREIGN PATENTS

| | | |
|---|---|---|
| 533,803 | Italy | Oct. 1, 1955 |